United States Patent

[11] 3,548,902

| [72] | Inventor | James A. Holly<br>Olympia, Ill. |
|---|---|---|
| [21] | Appl. No. | 789,141 |
| [22] | Filed | Jan. 6, 1969 |
| [45] | Patented | Dec. 22, 1970 |
| [73] | Assignee | Hollymatic Corporation<br>a corporation of Illinois |

[54] APPARATUS FOR PRODUCING MIXED SUBDIVIDED FOOD MATERIAL
11 Claims, 3 Drawing Figs.

[52] U.S. Cl. .................................................. 146/79, 146/124, 146/186
[51] Int. Cl. .................................................. B26d 4/28, B26d 4/44
[50] Field of Search .......................................... 146/79, 105, 124, 125, 78, 182, 186

[56] References Cited
UNITED STATES PATENTS

| 918,320 | 4/1909 | Hess ............................ | 146/125 |
| 3,310,086 | 3/1967 | Lasar ........................... | 146/186 |
| 3,450,179 | 6/1969 | Golding ........................ | 146/78X |

Primary Examiner—Willie G. Abercrombie
Attorney—Hofgren, Wegner, Allen, Stellman and Mc Cord ABSTRACT: An apparatus for providing a mixed mass of subdivided food material such as meat, fish and the like from a source of such material including a block such as of frozen meat in which the apparatus comprises a mixing chamber for retaining a supply of the subdivided material for mixing thereof, a mixing device in this chamber comprising a rotatable mixing blade movable through the subdivided material therein for thorough mixing, a guide preferably in the form of a chute for directing subdivided material from the block into the chamber for mixing, a movable support member intercepting the guide during movement of the support member for retaining it in the guide while the block is being subdivided as the first step in the mixing operation in which the support member comprises means on which the block rests, a movable subdivider spaced above the support member of a length to move through the block on movement of the food material from the block and a passage through the support member for passing of the subdivided successive portions from the block into the chamber by way of the guide means.

APPARATUS FOR PRODUCING MIXED SUBDIVIDED FOOD MATERIAL

It is a customary procedure in preparing ground meat, fish and the like to mix subdivided portions of the material prior to grinding so that a homogeneous ground product will result. The apparatus of this invention provides an efficient mixing of subdivided food material of which one source of the material is a block thereof such as a frozen block of the food material. The result is that the apparatus not only subdivides this block and feeds the subdivided portions into a mixing chamber where thorough mixing is accomplished, but the mixing begins immediately because the subdivided portions as soon as they are separated from the block achieve a certain degree of mixing on their own in passing from the subdivider portion of the apparatus into the principal mixing portion which is the chamber for retaining a supply of food material. This supply may be entirely from the block or may comprise portions from the block and portions from a separate source such as unfrozen scraps of meat that are introduced separately into the mixing chamber. The entire apparatus therefore provides a thorough mixing of subdivided food material.

The apparatus of this invention may be used for mixing only but preferably also incorporates as a part of the apparatus a grinder so that the mixing portion of the apparatus not only provides for the uniform and rapid mixing but also feeds the mixed material from the mixing chamber into the grinder.

The invention will be described as related to the embodiment in the drawings of which:

Figure 1:
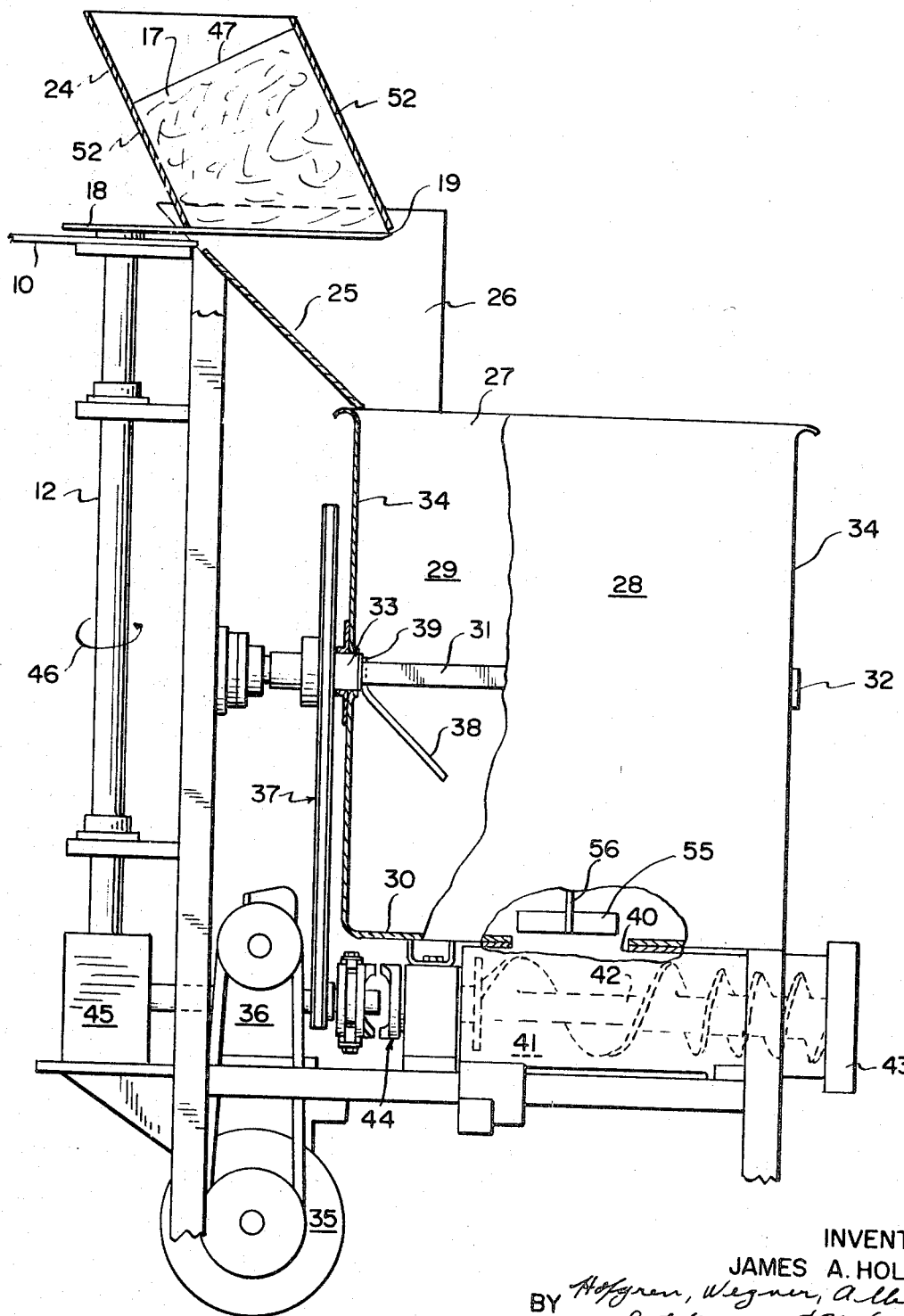
FIG. 1 is a side elevational view partially in section and partially broken away for clarity of illustration of one embodiment of the invention.

In the illustrated embodiment of the apparatus there is provided a movable support member here shown as a supporting plate 10 with an arcuate peripheral edge 11 extending for approximately 240°. This plate 10 is mounted for rotation on a vertical drive shaft 12 and when rotated moves in a substantially horizontal plane.

The supporting plate 10 is provided with passage means 13 in the form of a peripheral opening that is defined by a trailing edge 14 and a leading edge 15 spaced apart about 120°. The trailing and leading edge terms are used in relation to the direction of rotation of the plate 10 as indicated by the arrow 16.

Figure 3:
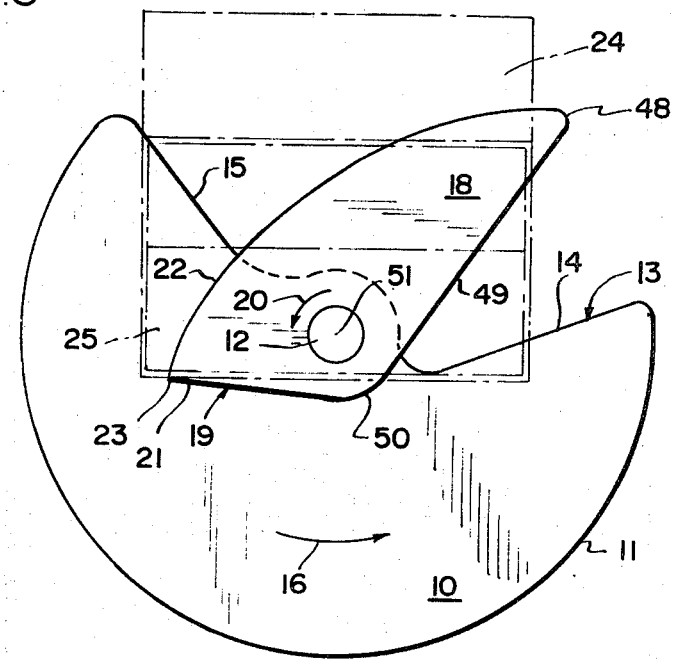
FIG. 3 is a plan view of the movable support member or rotatable support plate and associated subdivider means or cutter spaced thereabove with the feed chute shown in broken lines to illustrate its relationship to these two elements.
Figure 2:
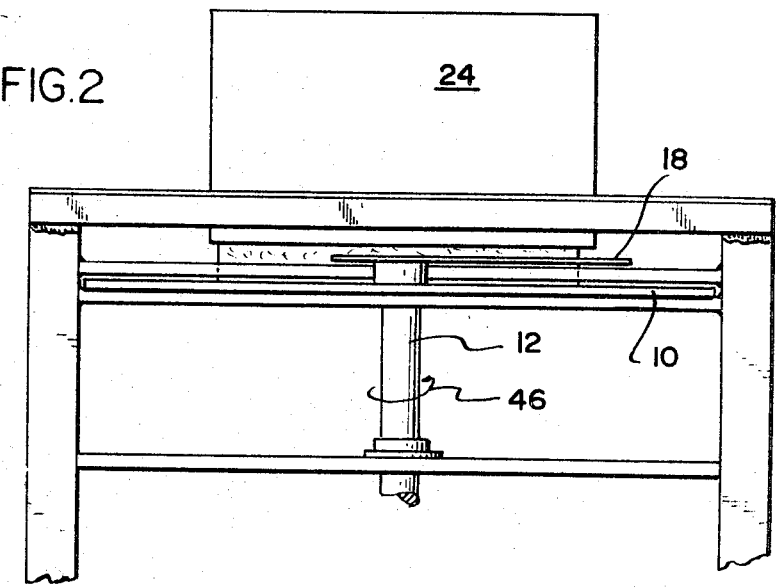
FIG. 2 is a fragmentary side elevational view taken from the left side of FIG. 1.

The supporting plate 10 is adapted to retain the block or mass 17 of solid food material which in this embodiment is a frozen block of meat while it is being subdivided by a subdivider means 18, here shown as a cutter plate that is mounted on the same drive shaft 12 that the plate 10 is mounted on. As shown most clearly in FIG. 3, this cutter 18 is provided with a leading edge 19 that is the first edge in the direction of rotation indicated by the arrow 20 with this leading edge being shaped to provide a knife cutting edge arranged in two sections 21 and 22 that are at an angle to each other of less than 180°. In the illustrated embodiment this angle at the point 23 where they join is approximately 90°. The first edge section 21 is considerably shorter than the other section 22 as can be seen in FIG. 3. This short section 21 is shorter than the radius of the supporting plate 10. The cutter also has a trailing edge 49 located forwardly of the plate opening trailing edge 14.

In order to retain the block of material 17 against substantial lateral displacement in the direction of movement 16 of the supporting plate 10 there is provided a guide means 24 for retaining this material. In the illustrated embodiment this guide means is in the form of an inclined chute that retains the block 17 for gravity feed to the support plate 10 and the cutter 18. As shown in FIG. 1 the cutter 18 is supported above the support plate 10.

Beneath the horizontal plane of rotation of the supporting plate 10 there is located an inclined second chute 25 having spaced lateral sides 26 thereon to prevent spillage of the subdivided material with this chute 25 leading to the open top 27 of a vat 28 that has an interior mixing chamber 29 with an arcuately rounded bottom 30. At about the center of the chamber 29 there is located a generally horizontal shaft 31 that is rotatably held in end bearings 32 and 33 that are retained in the sidewalls 34 of the vat 28.

The shaft 31 is rotated by an electric motor 35 that drives a gear reducer 36 which in turn drives the shaft 31 by a conventional chain and sprocket arrangement 37.

Mounted on each end of the rotatable shaft 31 are sets of end mixing blades or paddles 38, of which only one-half of one set is shown, and center mixing blades or paddles 55, of which only one is shown. Each mixing blade 38 in each set is mounted on the opposite end of a transverse support bar 39 and each blade 55 (only one shown) is mounted on the end of a bar 56.

In the bottom of the vat 28 there is located an exit opening 40 adjacent the path of travel of the blades 55 leading to a grinding chamber 41 in which is located a rotatable material moving screw 42 that leads to a conventional grinding head 43. This screw 42 is adapted to be driven by means of a clutch 44 of conventional construction. The clutch 44 and thus the screw 42 is driven from the gear reducer 36.

The gear reducer 36 also selectively drives the shaft 12 for the support plate 10 and the cutter 18 through a gear box 45.

Thus the subdivider apparatus embodied in the support plate 10 and the cutter 18, the mixer including the mounting shaft 31 and mixing blades 38 and 55 thereon in the chamber 29 and the grinder 42—43 are all selectively rotatable from a common power means embodied in the motor 35 and gear reducer 36 operated therefrom.

The operation of the invention is as follows. When a block 17 of material such as frozen meat is placed in the chute 24 and the drive shaft 12 is rotated from the motor 35 by way of the gear reducer 36 and gear box 45 the shaft 12 rotates in the direction indicated by the arrow 46 and during this rotation the support plate 10 and cutter 18 rotate in unison. The block 17 in this embodiment rests by gravity on the plate 10 and for each complete rotation of the shaft 12 the cutter 18 moves through the bottom of the block 17 in an area spaced above the plate 10 to produce a slice that is equivalent in thickness to the distance between the plate and the cutter 18. The knife edge 19 of the cutter will ordinarily slice through the bottom of the block 17 and this slice will immediately fall through the peripheral opening in the plate 10 onto the second chute 25 and from there into the mixing chamber 29. Thus, successive complete rotations of the drive shaft 12 form successive subdivided portions of the mass 17 with each dropping in succession into the mixer vat 28 chamber 29. Both the cutting and the shocks of the falling material tend to aid subdividing and preliminary rough mixing of the meat or other food material. Sometimes, because of the nature of the block 17, the subdivided portions will not be in the form of successive slices because the food material will break apart or crumble.

Ordinarily, concurrently with the slicing or subdividing, the mixer shaft 31 is energized so that the mixing takes place while the portions are passing into the mixing chamber. Then, after a proper amount of mixing, the material is ground by activating the grinder feed screw 42 through the clutch 44. When this occurs, mixed material passes by gravity and under the urging of central mixing blades 55 through the opening 40 into the grinding chamber 41 and is forced through the grinding head 43 by the screw 42.

The subdividing and preliminary mixing portions of the apparatus rapidly break up a block of material either in slices or in other subdivided form. It is particularly applicable for use with frozen blocks of beef for making ground beef or hamburger. In one embodiment of the invention the beef was in the form of 60-pound blocks that were about 22 inches by 16 inches by 8 inches that were frozen to a few degrees below 32°

F. so that the blocks were self-supporting but not excessively hard. In this example the beef was about 27—28° F. (In most instances the food material is preferably no colder than about 25° F.) The support plate 10 and cutter 18 were rotated at about 55 r.p.m. and the entire 60-pound block was subdivided in shortly over a minute.

The block 17 initially has flat opposite ends as illustrated by the end 47. Because the chute 24 is at an angle to the support plate 10 the block initially rests with only one edge on the plate. The chute 24 has enclosing sides 51 that hold the mass 17 against substantial lateral movement during the subdividing. Because of the angle of inclination of the chute 25 the plate 10 is not subjected to the dead weight of the 60-pound block when the mass 17 is first placed in the chute 24 with the support plate stopped.

When the apparatus is activated the rotating cutter 18 cuts successive slices from the block 17 which fall by gravity onto the chute 25 and from there into the mixing chamber 29. As shown in the drawings, the clutch 44 is disengaged so that the grinder is inoperative. The rotating cutter 18 causes the first section 21 of the leading knife edge 19 to stab into the block at about the point 23 and hold the meat so that the remainder of the cutter can enter the block and cut the slice. The section 21 has an effective length from the point 23 to the end 50 which is radially opposite the axis 51 of rotation of drive shaft 12. The second section 22 of this leading knife edge which extends away from the first section 21 and thus away from the axis of rotation of the shaft 12 toward the extreme end 48 of the cutter gives a slicing-cutting action which completes the severing of the slice. As the cutter progresses through the block 17, the slices or subdivided portions begin immediately to pass into the mixer through the support plate 19 opening 13. This opening is defined by the angled edges 14 and 15 in the support plate 10 so that the plate 10 supports the mass at all times and this support is of course aided by the cutter 18 which extends across the opening 13.

The apparatus of this invention has a number of very important advantages. The principal one, of course, is that it produces quite rapidly a remarkably uniform mixture of subdivided food material from a source of such material that includes a block of the material such as a frozen block that is customarily used particularly in the ground meat business. The apparatus includes a device for subdividing such a block of food material and this subdividing also produces a preliminary mixing and breaking up prior to the principal mixing which of course is in the mixing chamber 29. Thus, as the cutter removes portions from the block 17 these fall onto the inclined chute 25 and the shock of engagement with the chute causes a breaking up and intermingling. Then, the material falls from the chute 25 into the mixing chamber 29 and this causes a further mixing and intermingling. Then, the final uniform mixing takes place within the chamber 29 by the action of the end mixing blades 38 and the center blades 55 all rotating with the central shaft 31 on which they are mounted by means of the end crossbars 39 and the central crossbar 56.

I claim:

1. Apparatus for providing a substantially uniform mixture of subdivided food material from a source thereof including a block of food material, comprising: means forming a mixing chamber for retaining a supply of said material; a mixing device therein comprising a rotatable mixing blade in said chamber movable through the subdivided food material therein for mixing said material; guide means for directing subdivided material into said chamber for said mixing; a movable support member intersecting said guide means during movement of the support member, said support member comprising means on which said block of solid food material rests for retaining the block in said guide means; a movable subdivider means spaced above said support member of a length to move through said block on movement of said subdivider means for producing successive portions of said food material on successive movements of said subdivider means; passage means through said support member for passing of said subdivided successive portions therethrough and into said chamber by way of said guide means, said support member and subdivider means are each rotatable about an axis of rotation, said support member engages said block above said mixing chamber and on one side of said axis of rotation of said support member and subdivider means, said subdivider means extends across said passage means above said mixing chamber during said rotation of the support member and subdivider means; and means for rotating said support member and said subdivider means, said subdivider means having a trailing edge relative to the direction of rotation spaced forwardly of the trailing edge of said passage means.

2. The apparatus of claim 1 wherein said support member comprises a generally arcuate plate with said passage means comprising means defining a peripheral opening in said plate extending from about the center of said plate, the ends of said opening extending for about 120°.

3. The apparatus of claim 1 wherein said subdivider means has a leading edge spaced rearwardly of the leading edge of said opening.

4. Apparatus for providing a substantially uniform mixture of subdivided food material from a source thereof including a block of food material, comprising: means forming a mixing chamber for retaining a supply of said material; a mixing device therein comprising a rotatable mixing blade in said chamber movable through the subdivided food material therein for mixing said material; guide means for directing subdivided material into said chamber for said mixing; a support member rotatable about an axis and intersecting said guide means during rotation of the support member, said support member comprising a generally arcuate plate on which said block of solid food material rests on one side of said axis for retaining the block in said guide means; a subdivider means rotatable about an axis and spaced above said support member of a length to move through said block on movement of said subdivider means for producing successive portions of said food material; passage means comprising a peripheral opening through said support plate across which said subdivider means extends during said rotation of the support member and subdivider means for passing of said subdivided successive portions therethrough and into said chamber by way of said guide means; and means for rotating said support member and said subdivider means about their said axes, said subdivider means comprising a cutter having a trailing edge relative to the direction of rotation spaced forwardly of the trailing edge of said opening and a leading edge spaced rearwardly of the leading edge of said opening, said leading edge of the cutter comprising a knife edge arranged in two sections at an angle to each other of less than 180°.

5. The apparatus of claim 4 wherein a first said section is adjacent the axis of rotation of said cutter and a second said section extends outwardly from said axis, said means for rotating the cutter causing the first section to first contact said mass.

6. The apparatus of claim 5 wherein said first section is shorter than the radius of said plate.

7. The apparatus of claim 1 wherein said guide means comprises a chute inclined with respect to the horizontal leading to said mixing chamber, the chute having an entrance for receiving said block and an exit lower than the entrance adjacent said support member and subdivider means.

8. The apparatus of claim 4 wherein a first of said two sections is shorter than the radius of said plate and is located adjacent the axis of rotation of said cutter and a second said section extending outwardly from said axis, said means for rotating the cutter causing said first section to contact said block before said second section contacts said block.

9. The apparatus of claim 8 wherein said guide means comprises a chute leading to said mixing chamber, the chute having an entrance for receiving said block and an exit adjacent said support member and subdivider means, and there are provided common power means for selectively rotating said support member, subdivider means and mixing blades.

10. The apparatus of claim 1 wherein said guide means comprises a chute leading to said mixing chamber, the chute having an entrance for receiving said block and an exit adjacent said support member and subdivider means, and there are provided an exit means from said mixing chamber means, a rotatable grinder receiving said material from said exit means, and common power means for selectively rotating said support member, subdivider means, mixing blade and grinder.

11. The apparatus of claim 9 wherein there are provided an exit means from said mixing chamber, a rotatable grinder receiving said material from said exit means, and said common power means also selectively rotates said grinder.